United States Patent [19]

Koyama et al.

[11] 4,096,099

[45] Jun. 20, 1978

[54] POROUS SYNTHETIC RESIN FILM

[75] Inventors: Kenji Koyama; Syotaro Ohno, both of Shin-nanyo, Japan

[73] Assignee: Toyo Soda Manufacturing Co., Ltd., Japan

[21] Appl. No.: 686,573

[22] Filed: May 14, 1976

[30] Foreign Application Priority Data

May 29, 1975 Japan ............................... 50-63518

[51] Int. Cl.² ................................................ C08J 9/00
[52] U.S. Cl. ............................ 260/2.5 D; 260/2.5 M; 260/2.5 HB
[58] Field of Search ........... 260/2.5 M, 2.5 D, 2.5 HB

[56] References Cited

U.S. PATENT DOCUMENTS

| 3,171,820 | 3/1965 | Volz | 2/97 |
| 3,378,507 | 4/1968 | Sargent et al. | 260/2.5 M |
| 3,860,538 | 1/1975 | Guillet et al. | 260/2.5 HB |

*Primary Examiner*—M. J. Welsh
*Attorney, Agent, or Firm*—Oblon, Fisher, Spivak, McClelland & Maier

[57] ABSTRACT

A porous synthetic resin film which comprises fine cylindrical holes of from 70 to 2,000 A in diameter which are formed by removing the fine cylindrical component of an AB-type or an ABA-type block copolymer.

6 Claims, 1 Drawing Figure

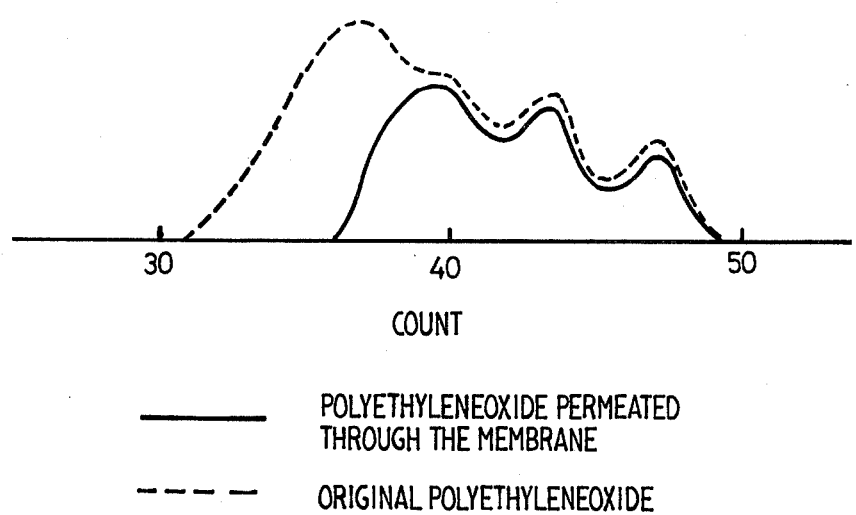

POROUS SYNTHETIC RESIN FILM

BACKGROUND OF THE INVENTION

1. FIELD OF THE INVENTION

The present invention relates to a porous synthetic resin film having many fine communicating holes which is useful as a filter.

2. DESCRIPTION OF THE PRIOR ART

Heretofore, porous films used for an air permeable diaphragms, filters and the like include paper, glass fiber sheets, synthetic fiber sheets, cellulose derivative filters and the like. It is desired to use membranes having narrow hole size distribution for filters. However, commercial filters have broad hole size distribution. For example, filters having an average hole diameter of 5 μm will pass particles having a diameter of 10 μm. Typical of filter problems is where the communicating holes in the filter have various portions, each having different diameters. Accordingly, a particle may pass into one communicating hole, but may be caught at a part of the hole which has a smaller diameter than the hole opening which causes clogging to occur. The clogging cannot be prevented by stirring the solution on the surface of film and the life of film is remarkably decreased.

Accordingly, there exists a need for porous films having uniform, fine cylindrical communicating holes.

SUMMARY OF THE INVENTION

It is an object of the present invention to provide a porous synthetic resin film having uniform, fine, cylindrical communicating holes.

This and other objects of the present invention have been attained by providing a porous, synthetic resin film formed by removing a fine cylindrical component from a film of the AB-type or the ABA-type block copolymer which has a fine cylindrical A component or B component.

DETAILED DESCRIPTION OF THE PREFERRED EMBODIMENTS

It is known that when the miscibility between component A and component B is low in the AB-type or ABA-type block copolymer which has narrow distribution of components and molecular weight, in a specific ratio of component A to component B, uniform regular cylindrical components having uniform diameter in the range of 70 A to 3,000 A are formed in the film because of microphase separation. The present inventors have succeeded in preparing a porous, synthetic resin film in which each of the fine communicating holes has uniform diameter throughout by removing this cylindrical component from the film. That is, the present invention provides a porous, synthetic resin film which is formed by removing the fine cylindrical component from a film of AB-type or ABA-type block copolymer which has a fine cylindrical component of component A or component B.

The AB-type block copolymers used in the present invention are the block copolymers having one molecular chain connecting polymer chain A and polymer chain B at the terminals thereof. The ABA-type block copolymers used in the present invention are block copolymers having one molecular chain connecting polymer chain A, polymer chain B and polymer chain A in that order. The invention will be further illustrated in detail.

One component of the two components of the block copolymer, which forms the continuous phase without forming the fine cylindrical phase, should be the polymer of the porous synthetic film of the invention, and accordingly, the component should have sufficient mechanical strength so as to be used as the film, it is preferable that it have a softening point higher than 60° C. Suitable components include vinyl type polymers such as polyacrylonitrile, polymethacrylonitrile, polymethylmethacrylate, polystyrene, poly-t-butyl crotonate, polybutylisocyanate, polyamylisocyanate, polyhexylisocyanate, polyoctylisocyanate etc.; and polycondesnation-type polymers such as polycarbonates, polyesters etc. Suitable combinations of the component for the continious phase and the component for the fine cylindrical phase are as follows. The following is the list of components.

PSt = Polystyrene
PMMA = Polymethylmetacrylate
PTBCr = Polytert-Butyl crotonate
PTBC = Polytert-butyl cinnamate
PMAN = Polymethacrylonitrile
PAN = Polyacrylonitrile
PBIC = Poly n-butylisocyanate
PAIC = Poly n-amylisocyanate
PBd = Polybutadiene
PIp = Polyisoprene
PCp = Polychloroprene
PMVK = Polymethylvinylketone
PPVK = Polyphenylvinylketone
PHIC = Poly n-hexylisocyanate The following is a list of the combinations.

| Continuous phase | Fine cylindrical phase | Continuous phase | Fine cylindrical phase |
|---|---|---|---|
| PSt | PBd | PMAN | PIp |
| " | PIp | PMAN | PMVK |
| " | PCp | PAN | PBd |
| " | PMVK | PAN | PIp |
| PMMA | PBd | PAN | PMVK |
| " | PIp | PAN | PPVK |
| " | PCp | PBIC | PIp |
| " | PMVK | PBIC | PBd |
| PTBCr | PBd | PBIC | PMVK |
| " | PIp | PAIC | PIp |
| PTBCr | PMVK | PAIC | PBd |
| PTBC | PBd | PAIC | PMVK |
| PTBC | PIp | PHIC | PIp |
| PTBC | PMVK | PHIC | PBd |
| PTBC | PPVK | PTBCr | PBIC |
| PMAN | PBd | PTBCr | PAIC |

The other component which forms the fine cylindrical phase should be easily removable from the film of the AB-type or ABA-type block copolymer by decomposition etc. The components having the desirable properties for the fine cylindrical component include polybutadiene, polyisoprene and polychloroprene which are easily oxidized by ozone. The oxidized polymers can be easily decomposed by treatment with an acid or an alkali. The photodisintegratable polymethylvinyl ketone, polyphenylvinyl ketone etc. can be easily decomposed by irradiating with ultraviolet light, so as to remove it from the film. Accordingly, these are also suitable as the fine cylindrical component of said block copolymer. Polyesters, polycarbonates and polyamides which can be easily hydrolyzed with an acid or an alkali can also be used as the fine cylindrical component.

When the bond between component A and component B is an ester bond or an amide bond which is easily hydrolyzed, the fine cylindrical component can be dissolved by a solvent after decomposing the bonds with an acid or an alkali to obtain the porous synthetic resin film. The thickness of the film is preferably less than 20 µm. When it is more than 20 µm, the decomposition and separation of the fine cylindrical component are not smoothly conducted. The minimum thickness is about 0.5 µm. When the thickness is less than 0.5 µm, the handling of the film is quite difficult. Control of the diameter of the fine cylindrical component, that is the control of the diameter of the fine cylindrical holes, can be attained by controlling the molecular weight of the block copolymer. The diameter of the cylindrical holes is typically in the range of from 70 A to 3000 A. The diameter of the fine cylindrical holes can also be varied depending upon the types of components and the types of solvents used for preparing the block copolymer film.

Having generally described the invention, a more complete understanding can be obtained by reference to certain specific examples, which are provided herein for purposes of illustration only and are not intended to be limiting unless otherwise specified.

EXAMPLE 1

A film of AB-type block copolymer of t-butyl crotonate and butadiene having a thickness of 4 µm (the fine cylindrical component of polybutadiene having a diameter of 500 A was observed by the electron microscopic observation) was kept in a flow of air containing 6% of ozone for 36 hours and then the film was immersed in a methanol solution of nitric acid (30%) for 24 hours. According to electron microscopic observation, it was confirmed to form a porous poly-t-butyl crotonate film having fine cylindrical holes 500 A in diameter. The porous film had water permeability of 0.7 ml/min./cm$^2$ at 25° C under the pressure difference of 700 mm Hg. The porous film was used to concentrate a polystyrene latex having solid content of 5% and an average particle diameter of 900 A. When the latex on the surface of the porous film was stirred, the flow rate was 0.5 ml/min./cm$^2$, under a pressure difference of 700 mm Hg at a 20% solid content.

EXAMPLE 2

A film of a block copolymer of methacrylonitrile and methylvinyl ketone at a ratio of 2 : 1 by weight, having a thickness of 2 µm was immersed in a methanol solution of 2,6-di-tert-butyl-p-cresol (1%) and the film was irradiated with ultraviolet rays for 80 hours. Devitrification of the film occurred. According to electron microscopic observation, it was confirmed to form a porous polymethacrylonitrile film having fine cylindrical holes 150 A in diameter. The porous film had an air permeability of 0.25 l/cm$^2$/min. under a pressure difference of 700 mm Hg. Asbestos dust having a minimum dimeter of 300 A could be completely removed from air by passing the air through the porous film. The air permeability of the porous film was not lower than 0.18 l/cm$^2$/min. under a pressure difference of 700 mm Hg.

EXAMPLE 3

The polymerization of styrene by the living anion method, was stopped by feeding carbon dioxide gas when the average molecular weight attained 80,000. The terminals of the polystyrne were acylated with thionyl chloride, and reacted with polyethyleneoxide having an average molecular weight of 30,000 in toluene in the presence of pyridine. The reaction mixture was separated by a large size column separation to obtain the AB-type block copolymer. The bonds between the polystyrene chain and the polyethyleneoxide chain the block copolymer were ester bonds. A film of the block copolymer, having a thickness of 18 µm, was immersed in a 1N aqueous solution of sodium hydroxide at 60° C for 2 days. According to electron microscopic observation, it was confirmed to form a porous polystyrene film having fine cylindrical holes 80 A in diameter. The porous film had methanol permeability of 0.2 ml/cm$^2$/min. under a pressure difference of 700 mm Hg. A 2% methanol solution of polyvinylpyrrolidone having an average molecular weight of 60,000 was concentrated by using the porous film to obtain a 60% methanol solution of polyvinylpyrrolidone. No permeation of polyvinylpyrrolidone was found to occur.

EXAMPLE 4

A film of the block copolymer of acrylonitrile and butadiene, having a thickness of 5 µm (the fine cylindrical component of polybutadiene having a diameter of 110 A) was treated in accordance with the process of Example 1, whereby a porous polyacrylonitrile film having fine cylindrical holes, 110 A in diameter, was obtained. A 2% methanol solution of polyethyleneoxide (average molecular weight of 20,000) was passed through the porous film to methanol for 3 days for dialysis. The methanol phase was concentrated and tested. According to high speed liquid chromatography, the elution curve of polyethyleneoxide which permeated to the methanol phase through the porous film was compared with the elution curve of polyethyleneoxide in the original methanol solution. The results are shown in FIG. 1. The polyethyleneoxide permeated had sharp molecular weight distribution.

EXAMPLE 5

A film of the AB-type block copolymer of t-butyl crotonate and isoprene (the fine cylindrical component of polyisoprene having a diameter of 1500 A) was treated in accordance with the process of Example 1, whereby a porous poly-t-butyl crotonate film having fine cylindrical holes 1500 A in diameter was obtained. A polystyrene latex having a solid content of 10%, an average particle diameter of 900 A was passed through the porous film. The permeability was 13 ml/cm$^2$/min. under a pressure difference of 700 mm Hg which was not changed during the operation. When the same polystyrene latex was passed through a cellulose ester film having fine holes 0.22 µm in diameter (Miripore Co. Ltd.) the permeability was 19 ml/cm$^2$/min. at the initial stage but was decreased to 14 ml/cm$^2$/min. after 5 minutes. The results show the fact that the porous poly-t-butyl crotonate film had narrow diameter distribution of the fine cylindrical holes.

EXAMPLE 6

A film of n-butylisocyanate-isoprene AB block copolymer (0.8 µm thickness), having a polyisoprene cylindrical component 100 A in diameter, was kept in air containing 5% of ozone for 20 hours. Then, the film was immersed in a 10% hydroxyperoxide aq. for 5 hours and then into methanol for a day. The porous film so obtained showed a methanol permeation of 0.08 ml/cm$^2$/min. under a pressure difference of 700 mm Hg.

Having now fully described the invention, it will be apparent to one of ordinary skill in the art that many changes and modifications can be made thereto without departing from the spirit or scope of the invention as set forth herein.

What is claimed and desired as new and intended to secured by Letters Patent is:

1. A porous synthetic resin film which comprises fine cylindrical holdes of from 70 to 3,000 A in diameter which are formed by removing the fine cylindrical component from the continuous phase component of a film of a block copolymer of the AB or ABA-type.

2. The porous synthetic resin film of claim 1 wherein said continuous phase component is selected from the group consisting of polyacrylonitrile, polymethyacrylonitrile, polymethylmethacrylate, polystyrene, poly-t-butyl crotonate, polybutylisocyanate, polyamylisocyanate, polyhexylisocyanate, polyoctylisocyanate, polycarbonates and polyesters and said fine cylindrical component is selected from the group consisting of polybutadiene, polyisoprene, polychloroprene, polymethylvinyl ketone, polyphenylvinyl ketone, polyesters, polycarbonates, polyamides.

3. The porous synthetic resin film of claim 1 wherein said continuous phase component is bonded with an ester bond or an amide bond to the fine cylindrical component.

4. The porous synthetic resin film of claim 1 wherein said fine cylindrical component is decomposed by oxidation, photodisintegration or hydrolysis.

5. The porous synthetic resin film of claim 4 wherein the decomposed fine cylindrical component is removed with a solvent.

6. A method of preparing a porous synthetic resin film having fine cylindrical holes from 70 to 3,000 A in diameter which comprises removing the fine cylindrical component from the continuous phase component of a film of an AB-type or an ABA-type block copolymer.

* * * * *